Feb. 4, 1930.  J. H. ALTER  1,745,971
VALVE GEAR
Filed May 7, 1926   3 Sheets-Sheet 1
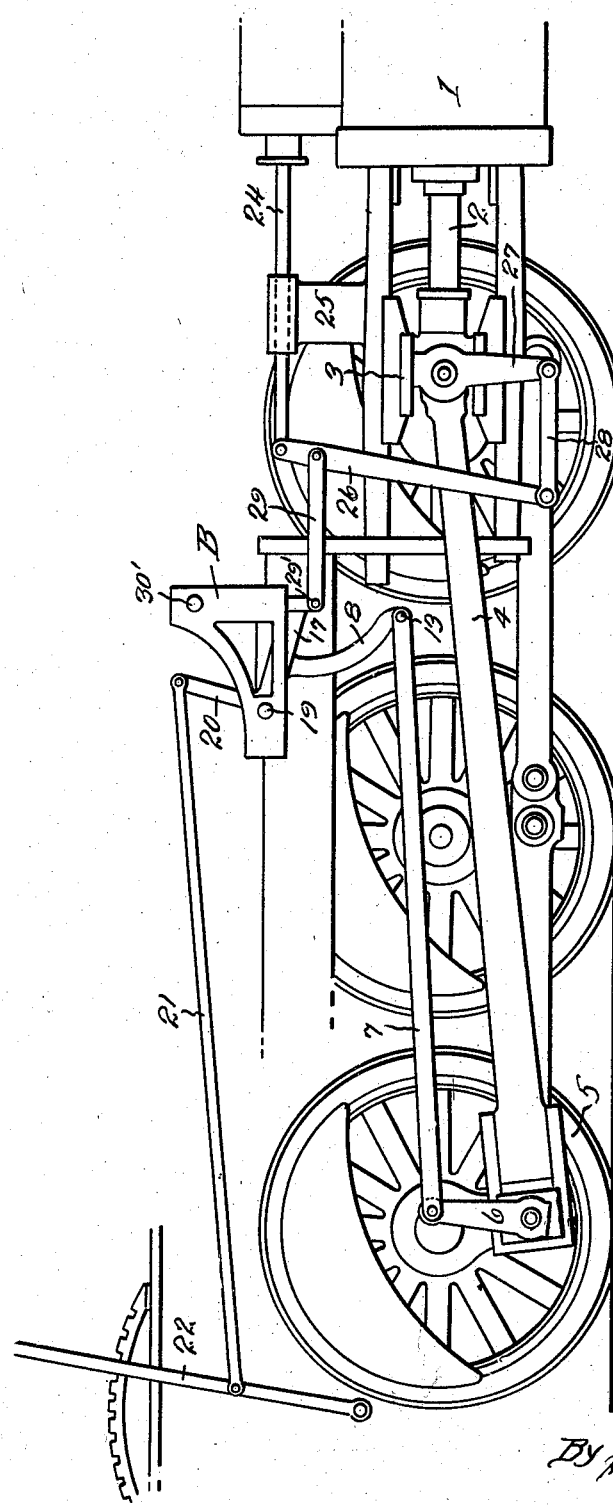
INVENTOR
John H. Alter
BY Hull Brock & West
Attys.

Feb. 4, 1930.  J. H. ALTER  1,745,971
VALVE GEAR
Filed May 7, 1926   3 Sheets-Sheet 2
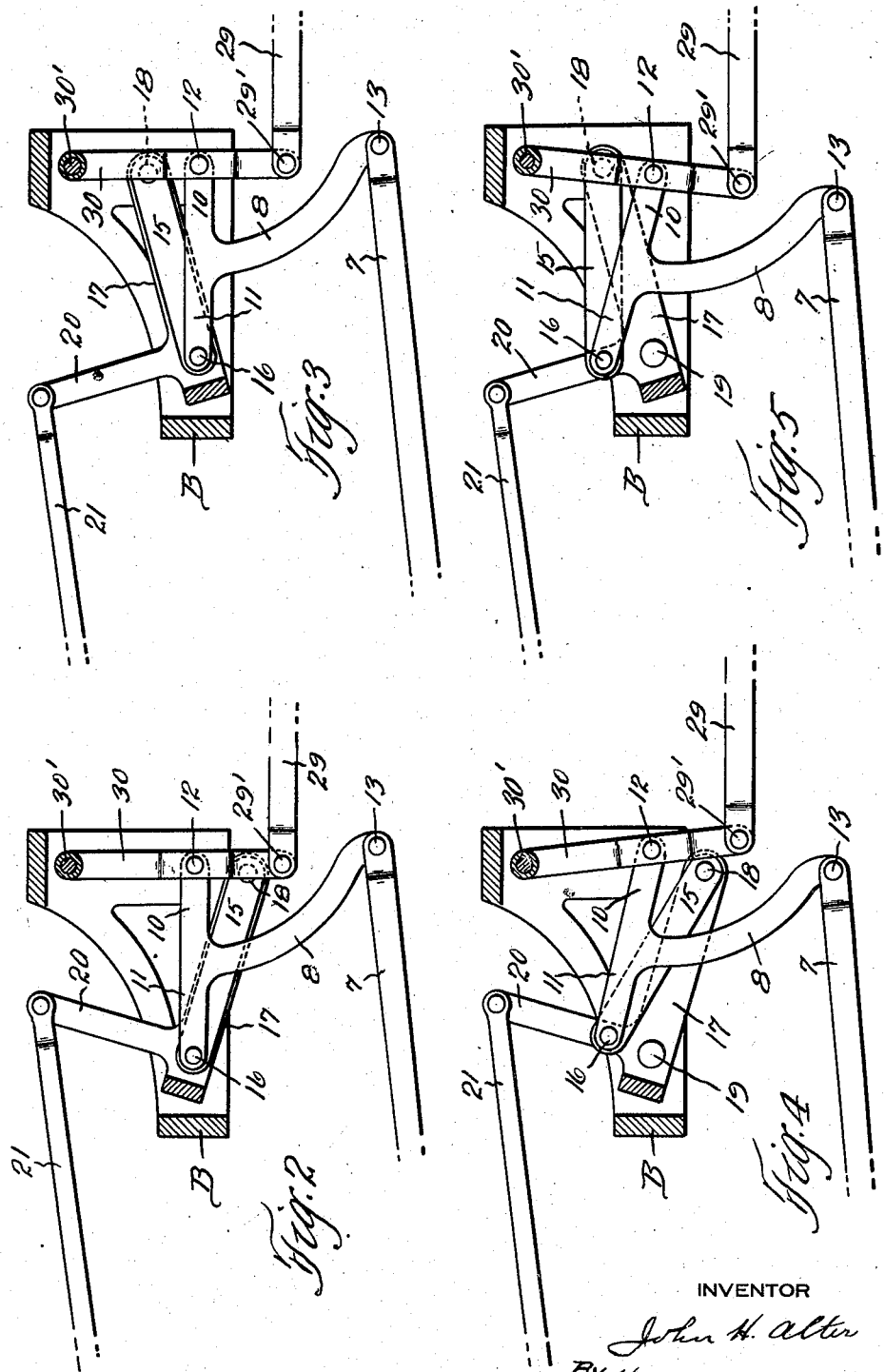
INVENTOR
John H. Alter
By Hull, Brock & West
Attys.

Feb. 4, 1930. J. H. ALTER 1,745,971
VALVE GEAR
Filed May 7, 1926   3 Sheets-Sheet 3
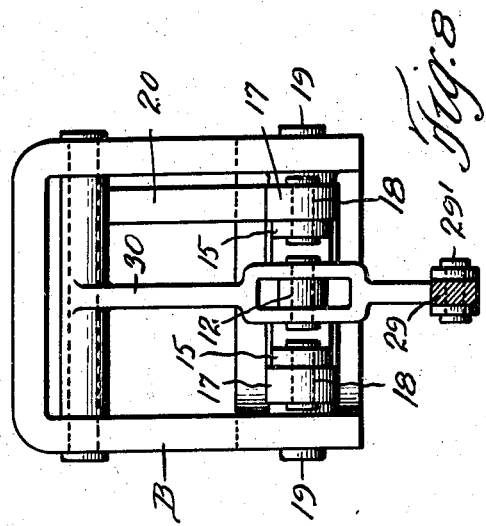
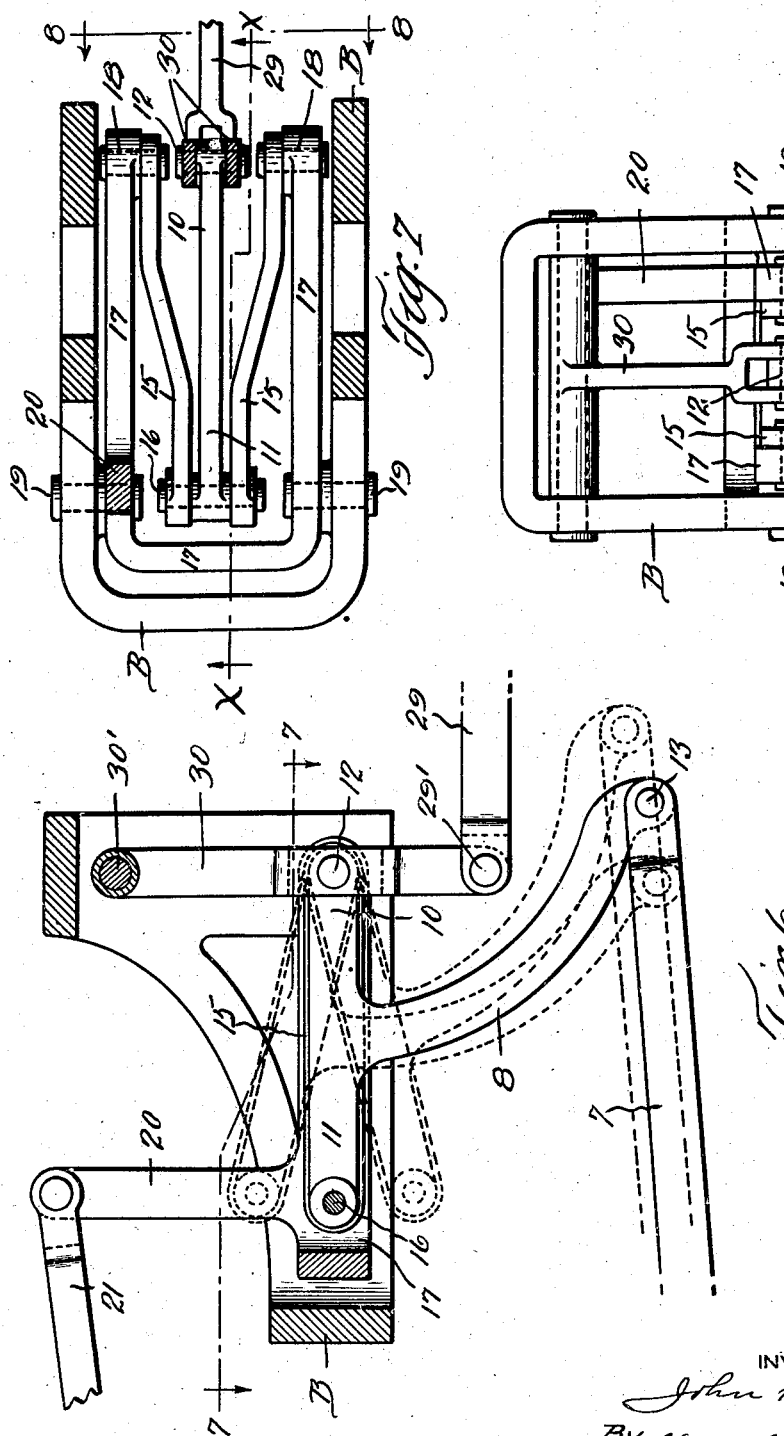
INVENTOR
John H Alter
By Hull, Broch & West
Attys.

Patented Feb. 4, 1930

1,745,971

UNITED STATES PATENT OFFICE

JOHN H. ALTER, OF CONNEAUT, OHIO

VALVE GEAR

Application filed May 7, 1926. Serial No. 107,354.

This invention relates to valve gears and is directed more particularly to a variable cut-off and reversing valve gear for locomotives although it is equally well suited for all classes of steam, air or other fluid propelled engines.

Some objects of the invention are to provide a valve gear which is adapted to operate the valves so as to provide equal steam distribution on both sides of the piston for variable points of cut-off in both the forward and back motions; to provide a valve gear which usually operate the valve at alternately fast and slow speeds during its travel thereby to effect a quick and full opening of the admission port at the proper period or beginning of each piston stroke and to maintain such opening until near the point of cut-off and then to effect a quick cut-off and release; to provide a valve gear which shall consist of a few parts which are simple in construction and inexpensive to manufacture; to provide a valve gear which shall consist of a minimum number of moving parts all of which are of a pivoted nature and hence eliminate any sliding bearings which might collect dust and dirt and cause undue wear between moving surfaces which would cause lost motion in the gear; to provide a valve gear which may be compensated at a plurality of points for irregularities of the main and eccentric rod, or any other irregularity that might occur due to the principle of change of levers or to angularity of the valve gear parts; while further objects and advantages will appear as the description proceeds.

The invention herein disclosed is an improvement over the valve gear disclosed in my Patent No. 1,578,249 and has particular reference to the method of mounting and supporting the valve gear. According to my improved construction I have provided a frame or casing which may be rigidly supported on a locomotive frame and which may practically enclose the moving parts of the valve. Further and more limited objects of my invention will appear as the description proceeds and by reference to the accompanying drawing in which Fig. 1 is a side elevation of my valve gear attached to a locomotive; Figs. 2, 3, 4 and 5 are vertical sectional views on the line X—X of Fig. 7 showing the valve gear in different positions; Fig. 6 is a vertical sectional view on the line X—X of Fig. 7 showing the parts in the neutral position in full lines; Fig. 7 is a horizontal sectional view on the line 7—7 of Fig. 6 and Fig. 8 is a view in end elevation of the valve gear secured within its frame and looking in the direction of the arrow in Fig. 7.

It will be understood that each cylinder and valve is operated through a valve gear similar to that to be described hereinafter. In the drawings 1 indicates the cylinder, 2 the piston rod, 3 the cross head and 4 the main rod which is operatively connected to a driving wheel in the usual or any approved manner. An eccentric crank 6 is also connected to the driving wheel 5 and has the free end thereof connected through an eccentric rod 7 with one end of a bell crank 8. The floating bell crank 8 is substantially T-shaped as shown in the drawings and is provided with oppositely disposed arms 10 and 11. This construction allows for a free and greater movement of the hanger arm 30 and connection 29. The pivotal connection of bell crank 8 with the valve mechanism is indicated at 12 and the pivotal connection of eccentric rod 7 with the connection lever is indicated at 13 and these pivot points as well as others to be referred to hereinafter are located in such a manner as to compensate for any irregularities of the main and eccentric rods or any other parts of the valve gear. If desired, means may be provided for adjusting the position of the eccentric rods with respect to the bell crank. The bell crank 8 is what may be termed a floating bell crank, that is, the pivotal connection points 12, 13 and 16 are not pivoted to a fixed point of a stationary object.

A pair of radius links 15 are each pivotally connected at one end to the end 11 of the motion lever as indicated at 16 (Fig. 7) and at their opposite ends said links are pivotally connected to the reverse yoke 17 as indicated at 18. The reverse yoke 17 and arm 20 provide essentially a bell crank and in my preferred construction this bell crank is preferably in the form of a U as shown most clearly in Fig. 7, and this yoke is mounted in a suitable frame member B for pivotal movement about trunnions 19, 19. The arm 20 of the reverse yoke is pivotally connected to a reach rod 21 which is connected at its opposite end to a reverse lever indicated at 22.

The valve stem is indicated at 24 and works through a suitable guide 25 and which is connected at its opposite end to lap and lead lever 26. The lap and lead lever may be mounted in the usual or any approved manner and in the present instance is shown connected with the cross head 27 through a lead link 28. The variable cut-off and reversing mechanism is connected at its other end to the lap and lead lever 26 by means of a valve rod 29. The valve rod 29 is pivotally secured as at 29' to a hanger arm 30 which is in turn pivotally secured to a fixed pivot 30' carried by the frame member B. If desired the point of connection of the valve rod 29 with the hanger arm 30 may be adjustable.

I have found that a valve gear constructed and arranged as described may be adjusted to compensate for irregularities of the various parts, at a number of points, so as to produce an ideal valve motion. In my preferred construction each of the pivot points 19 lies on an arc drawn with one of the points 18 as a center and passing through point 16. In other words the pivot points 19 and 16 lie in the same vertical plane when all parts of the valve gear are in the neutral position. Furthermore, the pivotal point of the reverse yoke bell crank may or may not form a right angle with reference to the pivotal connection between the reach rod 21 and the arm 20 and the pivotal connection 18 between the reverse yoke and the radius bars 15. In other words, the arms 11, 15 and 17 may be of equal length.

The same compensating features are true with respect to the bell crank 8, that is pivotal connection 12 may be on an arc drawn with the point 16 at its center with a radius equal to the distance between the pivot points 19 and 18. In other words, when the valve is in neutral position (Figs. 6 and 7) the pivot points 18 and 12 are in the same vertical plane. The lengths of the links or arms 11, 15 and 17 may be changed if desired so that the gear may be compensated at a plurality of points so that the valve will still have the desired motion and have equal cut-off in the forward and reverse movements over the entire range of variable cut-off points.

A further compensating feature may be secured by varying the angle which the hanger arm 30 makes with respect to the valve rod 29. That is, the valve rod 29 moves in an arcuate path with the hanger arm 30 as a radius and the pivot point 30' as a center and it will be obvious that the horizontal speed of the rod 29 increases as the hanger arm 30 approaches a vertical position and decreases as the rocker arm 30 recedes from such vertical position. It will therefore be clear that the movement of the valve rod 29 may be changed by varying the length of the hanger arm 30 and by changing the position of the pivot point 30'. In other words, a path between any two points on this arc can be selected by changing the pivot point of the hanger arm 30, and the motion derived cooperates with the motion from the other points of the gear to produce an ideal motion and it is possible by shifting the pivot point 30' to compensate for irregularities in the other elements of the gear.

Referring now to Figs. 1 to 7 inclusive, it will be seen that the eccentric rod 7 will impart an oscillating motion to the connection lever 8 and motion arms 10 and 11. These members which form the bell crank 8 will have a movement of translation with respect to the pivot point 18 and impart a reciprocatory motion to the valve rod 29. The combined motions of valve rod 29 and lap and lead lever 26 impart the desired motion to the valve stem 24, the lap and lead lever being of any approved type and forming no part of the present invention, a description of its motion is thought to be unnecessary. By referring to Figs. 3 and 5 it will be obvious that as the reverse lever 22 is moved to its maximum rearward position (to the left as seen in Figs. 2–5 inclusive), the point 18 will be moved to its maximum distance above point 12 and this will cause a maximum reciprocation of valve rod 29 which will give the largest cut-off. Similarly, as the reverse lever 22 approaches its neutral point (full lines in Fig. 6), the point 18 will approach point 12 and decrease the reciprocation of the valve stem 29 and valve rod 24, which of course shortens the cut-off. When the reverse lever 22 has been moved in such a position that point 18 coincides with point 12 (that is, lies in the same vertical plane as point 12), then motion of the eccentric rod 7 and bell crank 8 will be about points 18 and 12 which will not cause any displacement of the valve rod 29 and valve stem 24, hence the valve will remain stationary.

Referring now to Figs. 2 and 4, it will be seen that, as reverse lever 22 is moved to its forward position, pivot point 18 will be moved below point 12 and the motion of valve stem 24 will be opposite to that received when in the reverse motion previously described. When the reverse lever 22 is in its extreme forward position (Figs. 2 and 4) pivot point 18 will be moved to its maximum distance below point 12 and hence radius rod 29 and valve rod 24 will receive maximum reciprocation which will give greatest cut-off in the forward motion. Similarly, as reverse lever is moved toward neutral position (full lines in Fig. 6) the point 18 will move toward point 12 and decrease the cut-off until point 18 coincides (that is, in the same vertical plane as point 12) with point 12 whereupon the valve will remain stationary as previously described. Inasmuch as a portion of the valve gear is composed of two bell cranks arranged in opposed relation and interconnected by radius links 15, it will be obvious that this portion of the gear may be inverted, if desired, and still perform its function.

It will now be clear that I have embodied a device which will accomplish the objects of the invention as hereinbefore stated.

Having thus described my invention, what I claim is:—

1. In a valve gear, a fixedly mounted frame, a bell crank pivotally mounted in said frame, a reversing lever connected with one end of said bell crank, a floating bell crank and a link connecting one end of the same with the said first mentioned bell crank, a hanger arm pivotally mounted in said frame, and a connection between the opposite end of said floating bell crank and said hanger arm and means connecting said hanger arm with a valve, said floating bell crank being substantially T-shaped and means for imparting a translatory motion thereto.

2. In a valve gear, a fixedly mounted frame, a reversing yoke pivotally mounted in said frame, a floating bell crank and a link connecting one end of the same with said reversing yoke, a rocking arm pivotally mounted in said frame and a connection between said floating bell crank and said hanger arm intermediate the ends thereof, a valve actuating lever connected with said hanger arm and means for imparting a translatory motion to said floating bell crank.

3. In a valve gear, a frame, a reversing yoke pivotally mounted in said frame, a floating bell crank, a link connecting one end of said floating bell crank with said yoke, a hanger arm pivotally mounted in said frame, and a valve actuating lever connected with said hanger arm, a pivotal connection between the opposite end of said floating bell crank and said hanger arm intermediate the ends thereof and means for imparting a translatory motion to said floating bell crank.

4. In a locomotive valve gear, the combination of a frame, a reversing yoke pivotally mounted in said frame, a hanger arm having its upper end pivotally mounted in said frame, a floating bell crank having one end pivotally connected with said hanger arm intermediate the ends thereof, a link connecting the opposite end of said floating bell crank with said yoke, a reversing lever also connected with said yoke, a valve actuating lever connected with the lower end of said hanger arm, said floating bell crank having a projection thereon intermediate the ends thereof and means for operatively connecting said projection with a driving wheel of the locomotive.

5. In a locomotive valve gear, the combination of a frame, a reversing yoke pivotally mounted in said frame, a hanger arm having its upper end pivotally mounted in said frame, a floating bell crank having one end pivotally connected with said hanger arm intermediate the ends thereof, a link connecting the opposite end of said floating bell crank with said yoke, a valve actuating lever connected with the lower end of said hanger arm, means for connecting said reversing yoke with a reversing lever, said floating bell crank being substantially T-shaped and means for operatively connecting the lower end of the T-shaped floating bell crank with the locomotive driving wheel.

6. In a locomotive valve gear, the combination with a frame, of a reversing yoke pivotally mounted in said frame, of a reversing lever connected with one end of said reversing yoke, a floating bell crank and a link connecting one end of the same with reversing yoke, a hanger arm pivotally mounted in said frame and a connection between the opposite end of said floating bell crank and hanger arm, a valve actuating lever connected with said hanger arm and means for operatively connecting said floating bell crank with a driving wheel of the locomotive.

7. In a locomotive valve gear, the combination of a frame, a reversing yoke pivotally mounted in said frame, a hanger arm pivotally mounted in said frame, a floating bell crank having one end pivotally connected with said hanger arm intermediate the ends thereof, a link connecting the opposite end of said floating bell crank with said reversing yoke, a valve actuating lever connected with said hanger arm and means for operatively connecting said floating bell crank with a driving wheel of the locomotive for imparting a translatory motion to said floating bell crank.

In testimony whereof, I hereunto affix my signature.

JOHN H. ALTER.